M. P. WYNNE & S. L. WAGLEY.
APPARATUS FOR MANUFACTURING HEATING AND ILLUMINATING GAS.
APPLICATION FILED APR. 5, 1910.
964,832.
Patented July 19, 1910.
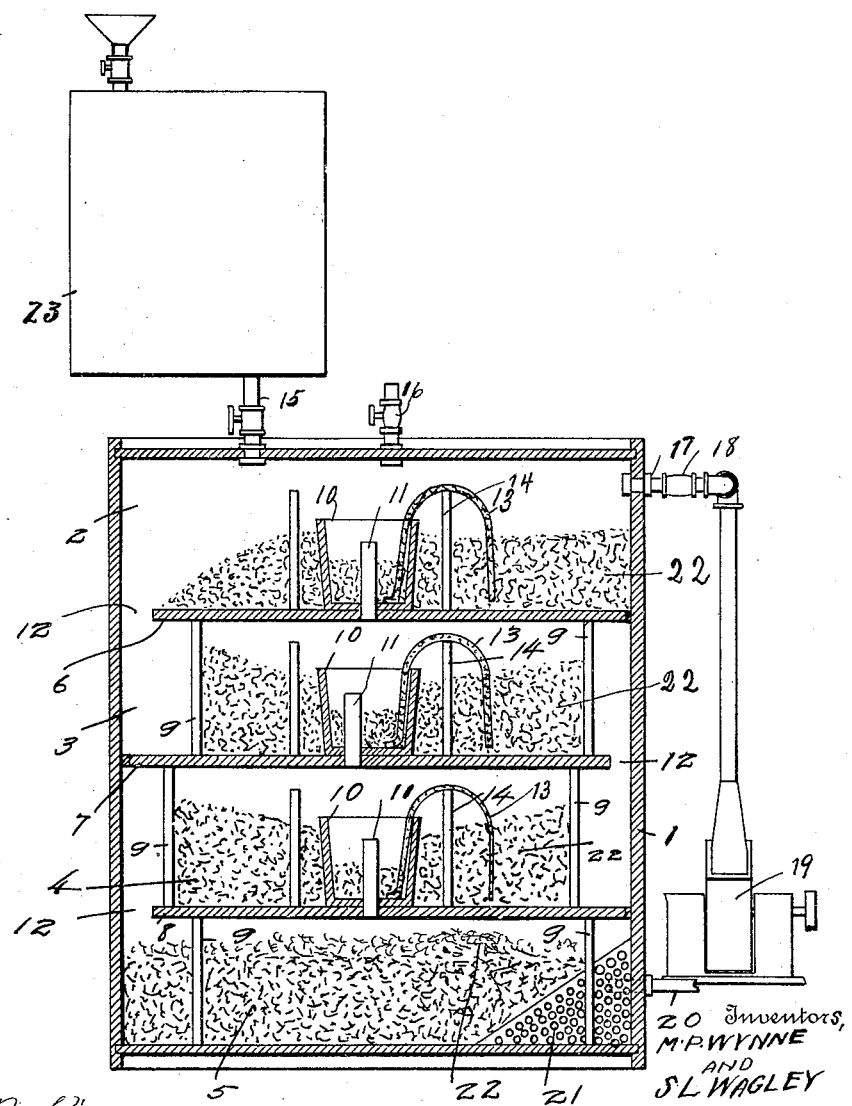

UNITED STATES PATENT OFFICE.

MILTON P. WYNNE AND SAMUEL L. WAGLEY, OF FORT WORTH, TEXAS.

APPARATUS FOR MANUFACTURING HEATING AND ILLUMINATING GAS.

964,832.   Specification of Letters Patent.   Patented July 19, 1910.

Application filed April 5, 1910. Serial No. 553,539.

*To all whom it may concern:*

Be it known that we, MILTON P. WYNNE and SAMUEL L. WAGLEY, both citizens of the United States, residing a Fort Worth, in the county of Tarrant and State of Texas, have invented certain new and useful Improvements in Apparatus for Manufacturing Heating and Illuminating Gas, of which the following is a specification.

This invention relates to apparatus for manufacturing heating and illuminating gas, and the object is to provide apparatus for making gas which can be furnished to consumers at small cost and which can be used for cooking, heating, smelting, illumination, and which can be utilized wherever a high grade of gas is needed and where intense heat is needed.

Another object is to provide apparatus for making either large or small quantities of gas, and one of the advantages of this invention is that either a small plant or a large plant can be established at very small cost and cheap material for making the gas can be utilized.

Other objects and advantages will be fully explained in the following description and the invention will be more particularly pointed out in the claims.

Reference is had to the accompanying drawings which form a part of this application.

The figure of drawing is a vertical section of a casing in which the process is accomplished and showing a blower connected with the casing.

A casing 1, preferably of wood, is provided. This casing must be made air-tight and the material should be such as will not be attacked by the gases or acids used in the manufacture of gas. A series of compartments 2, 3, 4, and 5 are formed in the casing by partitions 6, 7, and 8. These compartments may be increased or diminished in number and size and the casing may be made larger or smaller. The partitions are made of wood and the partitions are supported on legs 9 of wood. Earthen vessels 10 are placed on the partitions and provided with pipes 11 which project through the partitions. The partitions have passages 12 for the gas to go from one compartment to another. These passages 12 alternate from one side of the casing to the other to compel circulation of gas throughout each compartment. Wicks 13 are placed with one end down on the bottom of the vessel 10 and the other end hanging near the supporting partition. The wicks are provided with supports 14 of wood. These supports hold the wicks up and prevent them from lying flat. A pipe 15 is connected with the casing 1 for introducing fumes of gas from a vessel 23 which is a duplicate of the vessel 2 shown. The vessel or receptacle 23 is constructed with the same elements as those shown in vessel 2 so that the two vessels can be used in the same manner, but ordinarily only metal filings, salt, and acids are placed in the receptacle 23, and the fuel oil is placed in vessel 2. A pipe 16 is connected with the casing 1 for introducing oils, such as gasolene and benzin and naphtha. These oils are received in the vessels 10 and if more than one vessel full is supplied, the oils will overflow and pass to the next vessel 10 below. A pipe 17 is connected to the casing for injecting blasts of air and the pipe 17 is provided with a check valve 18. Any suitable blower 19 can be used for injecting air into the casing. A service pipe 20 is provided for carrying away the gas. This pipe is connected to the casing 1 and the mouth of the pipe is protected by a shield 21 which is to be made of wood and perforated so that gas will pass through to the pipe 20. The object of the shield is to prevent other matter than gas from entering the pipe 20.

Iron filings 22 are placed in the compartments substantially to the height shown in the different compartments and also in the vessels 10. More iron filings are inserted than is necessary for use at one time. It is not necessary that the entire mass of iron filings be treated at one time with an acid. The extent of such treatment is determined from the purpose for which the gas is used. It is necessary to have more iron filings than are in actual use so that it will not be necessary to replenish so often.

Gas is manufactured as follows: Gasolene is placed in the vessels 10. It may be sufficient to place gasolene only in the upper vessel 10. The wicks 13 will feed the oil to the iron filings or slugs 22. Acids, such as sulfuric, acetic, muriatic, and phosphoric acids, and salts, such as sodium chlorid and potassium chlorid are used for treating metallic filings or slugs. The metal, salt and acids are mixed and placed in the receptacles and additional acids and salt may be added as may be needed. The kind of gas, or rather, the purpose for which the gas is to be used, determines the kind of acid to be used. Gas for ordinary lighting purposes requires less heat in its manufacture than is required in the manufacture of gas which is to be used for heating or smelting. Acids and salt and such materials as produce rust from iron are introduced into vessel 23 and produce gas which escapes through the pipe 15. These materials attack the iron filings and produce rust and heat. The oils are converted into gas and mix with the rust and fumes. Natural air is forced into the casing by means of the blower. Fumes produced by acids and iron filings and salt come in through the pipe 15. The hydrogen thus generated is carbureted by means of the vapors of hydrocarbon oil and the air which is forced into the vessel. The mixture of these various elements produces a valuable commercial gas which may be used for any of the purposes above stated.

This invention contemplates providing metals of suitable character which are treated with acids for liberating fumes or hydrogen, as above described. The chemical action of the acids on the metal produce sufficient heat to vaporize the hydrocarbon and the hydrogen combines with the vaporized hydrocarbons.

Having fully described our invention, what we claim as new and desire to secure by Letters Patent is:—

1. Apparatus comprising a wooden vessel containing metal filings or slugs and provision for pouring acids on said metal filings or slugs, a second vessel communicating with the first named vessel, partitions dividing the second vessel into compartments, earthen vessels mounted on said partitions, short pipes projecting through said earthen vessels and partitions, said partitions having openings whereby each compartment has communication with the adjacent compartment, and a service pipe connected with the lowest compartment.

2. Apparatus comprising two wooden vessels connected together, metal filings or slugs and acids contained in one of said vessels, the other vessel having horizontal partitions partly dividing the vessel into compartments, earthen vessels mounted on said partition, short pipes projecting through said earthen vessels and said partitions, metal filings or slugs placed on said partition, means for inserting hydrocarbon oils into the upper earthen vessel, and a service pipe connected with the lowest compartment.

3. An apparatus comprising two wooden vessels, a pipe connecting the two vessels, one vessel being placed above the other, the upper vessel containing iron filings or slugs and acids, the lower vessel having horizontal partitions partly dividing the vessel into compartments, earthen vessels placed on said partition, provision for pouring hydrocarbon oil in said earthen vessel, short pipes projecting through said earthen vessel and through said partition, metal filings or slugs placed on said partitions, provision for pouring acids on said metal filings or slugs, the passages through said partitions alternating from side to side, and a service pipe connected to the lowest compartment.

4. An apparatus containing two wooden vessels, a pipe connecting said vessels, one vessel being placed above the other, the upper vessel containing metal filings and acids, the lower vessel having partitions dividing the same into compartments, metal filings on said partition, earthen vessels mounted on said partitions, short pipes projecting through said earthen vessels and partitions, means for forcing air into said lower vessel, a service pipe connected to the lowest compartment, and a screen for the mouth of said service pipe.

5. An apparatus containing upper and lower vessels, a pipe connecting the two vessels, the upper vessel containing acids and metals filings, the lower vessel having horizontal partitions dividing the same into compartments, earthen vessels placed on said partitions, short pipes projecting through said earthen vessels, said partitions having passages therethrough, metal filings placed upon said partitions and in said earthen vessel, provision for pouring hydrocarbon oils into the upper earthen vessel, wicks for siphoning oils out of said earthen vessel on the metal filings, means for forcing air into said lower vessel and a service pipe connected to the lowest compartment in said lower vessel.

In testimony whereof, we set our hands in the presence of two witnesses, this 19th day of March, 1910.

MILTON P. WYNNE.
SAMUEL L. WAGLEY.

Witnesses:
J. F. IVEY,
MAY W. IVEY.